United States Patent [19]
Aoki et al.

[11] Patent Number: 5,743,946
[45] Date of Patent: Apr. 28, 1998

[54] WATER-COLOR INK COMPOSITION AND PROCESS FOR FORMING AN INORGANIC COATING FILM

[75] Inventors: Yumiko Aoki, Yokohama; Makoto Sato, Koriyama, both of Japan

[73] Assignee: Asahi Glass Company Ltd., Tokyo, Japan

[21] Appl. No.: 767,642

[22] Filed: Dec. 17, 1996

[30] Foreign Application Priority Data

Dec. 18, 1995 [JP] Japan .................... 7-347504

[51] Int. Cl.⁶ .................................. C09D 11/00
[52] U.S. Cl. .................. 106/31.95; 106/31.94; 106/31.05
[58] Field of Search ............... 106/31.05, 31.94, 106/31.95; 501/20

[56] References Cited

U.S. PATENT DOCUMENTS

| | | | |
|---|---|---|---|
| 3,414,417 | 12/1968 | Miller et al. | 106/31.05 |
| 4,043,824 | 8/1977 | Wagar | 501/20 |
| 4,636,257 | 1/1987 | Baudry et al. | 106/31.95 |
| 4,717,690 | 1/1988 | Hankey et al. | 501/20 |
| 5,090,983 | 2/1992 | Boaz | 106/31.05 |
| 5,273,575 | 12/1993 | De Saint Romain | 106/31.05 |
| 5,338,350 | 8/1994 | Tanaka et al. | 106/31.94 |
| 5,407,473 | 4/1995 | Miura et al. | 106/31.95 |
| 5,421,877 | 6/1995 | Hayakawa et al. | 501/20 |
| 5,643,841 | 7/1997 | Yamaki et al. | 501/20 |

FOREIGN PATENT DOCUMENTS

| | | |
|---|---|---|
| 4-323278 | 11/1992 | Japan . |
| 6-80930 | 3/1994 | Japan . |

*Primary Examiner*—Helene Klemanski
*Attorney, Agent, or Firm*—Oblon, Spivak, McClelland, Maier & Neustadt, P.C.

[57] ABSTRACT

A water-color ink composition comprising a fusible inorganic component, an aqueous medium and an organic binder soluble and/or dispersible in the aqueous binder.

9 Claims, No Drawings

WATER-COLOR INK COMPOSITION AND PROCESS FOR FORMING AN INORGANIC COATING FILM

BACKGROUND OF THE INVENTION

1. Field of the Invention

The present invention relates to a water-color ink composition (hereinafter referred to simply as "a water-color ink"). More particularly, it relates to a water-color ink which, when printed on the surface of a heat resistant substrate and then baked, provides a dense baked coating film wherein a fusible inorganic component is firmly bonded to the surface of the heat resistant substrate, and a process for forming an inorganic coating film.

2. Discussion of Background

Heretofore, a printing ink is known which has a common fusible inorganic component and an inorganic power component (these may together hereinafter be referred to as "inorganic solid components") dispersed in a vehicle containing an organic solvent. As inorganic solid components in such a conventional ink, metal powder, glass frit or ceramic pigments may, for example, be mentioned. As a vehicle for such an ink, the one having an organic binder such as ethyl cellulose, nitro cellulose, an acrylic resin or a polyvinyl butyral resin, dissolved in an organic solvent such as α-terpineol, butylcarbitol or dibutylcarbitol acetate, is particularly used. With such conventional inks using organic solvent type vehicles, the dispersibility of inorganic solid components in such vehicles is excellent, and they have excellent printing properties, such as proper fluidity and leveling properties.

However, organic solvents used in conventional inks are volatile even in the working environment. In a step of drying a coating formed by printing, such an organic solvent will be discharged in the atmosphere, and to completely remove it, a large size exhaust system will be required. Accordingly, as a vehicle for inks, a shift to a less influential solvent system is desired. Further, a low viscosity coating material contains a large amount of a low boiling point, highly volatile organic solvent and thus requires an adequate disaster prevention system such as an explosion proof system or a drying system for spray coating or use of a tank for the coating material having a large opening, thus leading to high costs.

In recent years, in the field of a low viscosity coating material for e.g. spray coating, brush coating or dip coating, for example, JP-A-4-323278 and JP-A-6-80930 disclose water base paints using an aqueous epoxy compound, an aqueous acrylic resin, an aqueous polyester resin, an aqueous amino resin, an aqueous urethane resin or the like, as a film-forming component.

However, they are all intended to accomplish weather resistance, adhesion, processability, etc. by novel film-forming resins and directed to a coating system wherein the resin component maintains the adhesion with the substrate. With such coating materials, the heat resistance of the resins is limited, and the heat resistance of the formed coating is accordingly low. When such a coating is baked, the coating is likely to peel off, or the resulting film will have very low film strength and a film structure having many air bubbles. Accordingly, such a coating material is not useful for an application where it is baked after forming a coating to form a coating film made solely of an inorganic solid component, such as an application to form a decoration of ceramics such as glass or to impart a protecting film or a functional film for electronic parts.

Further, U.S. Pat. No. 4,043,824 discloses a ceramic color composition which solidifies with water or steam, but the coating itself is not water-base.

Further, in the application to screen printing where a high viscosity ink is required, none of conventional inks or coating materials, has been fully satisfactory because of problems such as drying and solidification of the ink during the operation.

SUMMARY OF THE INVENTION

Accordingly, it is an object of the present invention to provide a water-color ink employing an aqueous vehicle which is highly safe against a fire and in a natural environment, particularly a water-color ink which is capable of forming a coating film of an inorganic composition excellent in the adhesion and density even after removal of the resin component by combustion from the printed coating by baking, which used to be impossible by the prior art, and to provide a process for forming an inorganic coating film.

The present invention provides a water-color ink comprising a fusible inorganic component, an aqueous medium and an organic binder soluble and/or dispersible in the aqueous medium.

Further, the present invention provides a process for forming an inorganic coating film containing no organic substance, which comprises printing the above water-color ink of the present invention in an optional pattern on the surface of a heat resistant substrate by screen printing, following by drying and then by baking at a temperature at which an organic substance in the printed coating is removed and at which the fusible inorganic component fuses.

According to the present invention, by selecting and combining specific materials as ink-constituting components, it is possible to print an optional pattern by screen printing on the surface of a heat resistant substrate such as glass, and after its baking, a dense baked inorganic coating film wherein the fusible inorganic component is firmly bonded to the surface of the heat resistant substrate, can be obtained.

DETAILED DESCRIPTION OF THE PREFERRED EMBODIMENTS

Now, the present invention will be described in detail with reference to the preferred embodiments.

The water-color ink of the present invention comprises an inorganic solid component which consists essentially of a fusible inorganic component, or a fusible inorganic component and an infusible inorganic powder component, an aqueous medium, and an organic binder soluble and/or dispersible in the aqueous medium. Particularly, it is characterized by the construction of the aqueous vehicle comprising the aqueous medium and the organic binder.

The aqueous medium may be composed of water alone. However, it is preferred to incorporate an organic solvent which is capable of sufficiently dissolving and/or dispersing the organic binder in the aqueous medium and suppressing the viscosity change of the ink to improve the printing stability and which presents no substantial adverse effect to the environment. A preferred organic solvent is a glycol type organic solvent miscible with water. The glycol type organic solvent to be used in combination with water, may, for example, be ethylene glycol, diethylene glycol, an ethylene glycol lower alkyl (such as methyl or ethyl, the same applies hereinafter) ether, a diethylene glycol lower alkyl ether, a polyethylene glycol, propylene glycol, dipropylene glycol, a propylene glycol lower alkyl ether, a dipropylene glycol lower alkyl ether, or a polypropylene glycol. Among the above organic solvents, particularly preferred is a propylene glycol type organic solvent.

Such an organic solvent is used within a range of from 5 to 95 wt %, preferably from 10 to 80 wt %, in the aqueous medium composition. If the amount is less than 5 wt %, the drying speed of the water-color ink tends to be quick, whereby continuous printing tends to be difficult. On the other hand, if it exceeds 95 wt %, the water-soluble organic binder tends to be hardly soluble to provide excellent printing properties or excellent dispersibility of the inorganic solid components. If the amount of the organic solvent exceeds 50 wt % in the aqueous medium composition, the solubility of the water-soluble organic binder tends to be low, whereby agglomeration or precipitation may take place, and the stability in viscosity tends to be hardly obtainable. In such a case, by increasing the amount of an organic binder having a high solubility in a glycol type organic solvent, among various organic binders, it is possible to obtain a good viscosity stability.

The organic binder to be dissolved and/or dispersed in the above aqueous medium to obtain an aqueous vehicle, is an oligomer or polymer and is required to be an organic binder which presents a printing property of the resulting water-color ink, dispersibility of the inorganic solid components and an adhesive property to a heat resistant substrate such as glass and which will be completely burned and removed by baking after formation of a coating, so that no ash content will remain. Especially for screen printing, the viscosity characteristic and thixotropic property of the vehicle comprising the aqueous medium and the organic binder, are important. With respect to these properties, a cellulose derivative is particularly excellent as the organic binder.

However, in a case of a water-color ink employing an aqueous vehicle consisting solely of the cellulose derivative and the aqueous medium, depending upon the type of the cellulose derivative, the adhesion to a heat resistant substrate such as glass, the solvent resistance of the coating film and the film strength may sometimes be inadequate, or the viscosity increase of the aqueous vehicle sometimes tends to be so high that the fluidity of the resulting water-color ink tends to be inadequate. Accordingly, it is preferred to incorporate other organic binders capable of imparting various functions in addition to the cellulose derivative. Preferred examples of such other organic binders include aldehyde derivatives, epoxy compounds, acrylic resins, polyester resins, amide resins and polyethylene glycol derivatives. These binders may be used in a proper combination to obtain an aqueous vehicle most suitable for the purpose of the present invention.

Now, oligomers and polymers to be used as organic binders in the present invention will be described in further detail.

As the cellulose derivative, a cellulose ether such as methyl cellulose, hydroxypropylmethyl cellulose or carboxymethyl cellulose, is useful as a water-soluble thickening resin and is excellent in the printing property of the resulting water-color ink and in the dispersibility of the fusible inorganic component and the infusible inorganic powder component. The cellulose ether is used usually in an amount of from 0.2 to 30 parts by weight, preferably from 0.5 to 20 parts by weight, per 100 parts by weight of the aqueous medium. Within this range, the dispersion stability of the fusible inorganic component and the infusible inorganic powder component in the aqueous vehicle, is excellent. If the amount of the cellulose ether is less than 0.2 part by weight, the dispersion stability of the inorganic solid components tends to be inadequate, and the viscosity change of the water-color ink tends to result. If the amount of the cellulose ether exceeds 30 parts by weight, the combustion gas at the time of baking the coating tends to be generated in a large amount all at once, whereby many pores tend to be formed in the coating film, and the density of the resulting baked coating film tends to be low, and the film strength such as scratch resistance will consequently be low.

As the aldehyde derivative, glyoxal which is a polymerizable aliphatic aldehyde, is preferred. The glyoxal is highly water-soluble and is stable in the form of hydrated glyoxal. By carrying out printing with a water-color ink, followed by drying to evaporate water in the coating, a coating made of polyglyoxal is obtainable, whereby a coating having solvent resistance and a strong adhesive property to e.g. a glass substrate, is obtainable. The hydrated glyoxal is used usually in an amount of at most 30 parts by weight per 100 parts by weight of the aqueous medium. If the amount is too much, the viscosity property of the cellulose derivative tends to be impaired, and the printing property of the resulting water-color ink tends to be low. Further, for the purpose of improving the adhesive strength of the printed coating to a heat resistant substrate, the amount of this hydrated glyoxal is preferably at least 0.2 part by weight.

The epoxy compound may be the one which has a solubility of at least 50 wt % when 10 g of the hydrophilic epoxy compound is dissolved in 90 g of water at room temperature, or a polyepoxy compound which can be uniformly dispersed in an aqueous medium as an emulsion. It may, for example, be a compound such as ethylene glycol diglycidyl ether, polyethylene glycol diglycidyl ether, propylene glycol diglycidyl ether, polypropylene glycol diglycidyl ether, glycerol polyglycidyl ether, diglycerol polyglycidyl ether, polyglycerol polyglycidyl ether or sorbitol polyglycidyl ether, or a bisphenol type epoxy resin, or a cresol novolak type epoxy resin.

In the case of a water-soluble epoxy compound, it is used in an amount of at most 30 parts by weight per 100 parts by weight of the aqueous medium, whereby it is possible not to reduce the thixotropic properties of the water-color ink during printing and to cure the coating of the water-color ink by heating it at a temperature higher than a certain level to obtain a dried coating film having high scratch resistance and solvent resistance. Further, in the case of an epoxy resin emulsion, it is used in an amount of at most 25 parts by weight per 100 parts by weight of the aqueous medium, whereby it is possible to improve the fluidity of the water-color ink during printing and the dried coating film strength and to impart leveling property to the coating. If the amount exceeds this level, air bubbles tend to remain in the coating during baking of the coating, whereby the strength of the baked coating film tends to be low. When printing is made on the surface of a heat resistant substrate such as glass, it is preferred to incorporate at least one part by weight of the epoxy compound to obtain the adhesive strength of the dried film.

As the acrylic resin, a polyacrylic acid, an acrylate copolymer, a vinyl acetate/acrylic copolymer, or a polyacrylate may, for example, be used as an emulsion resin in an amount of at most 25 parts by weight per 100 parts by weight of the aqueous medium. If the amount exceeds this level, as in the case of the epoxy resin emulsion, air bubbles tend to remain in the coating during baking of the coating, whereby the strength of the baked coating film tends to be low. Further, it is preferred to incorporate it in an amount of at least 0.5 part by weight in order to improve the strength of the dried film and the fluidity of the water-color ink.

As the polyester resin, a water-soluble, glycol-soluble or water-dispersible polyester resin can be used. By using such a polyester resin, it is possible to attain the dispersion stability of the fusible inorganic component and the infusible inorganic powder component in the water-color ink. As such a polyester resin, a terephthalic acid/isophthalic acid copolymer polyester resin, a maleic anhydride/diethylene glycol condensed polyester resin may, for example, be mentioned. It is preferably used in an amount of at most 35 parts by weight per 100 parts by weight of the aqueous medium. If the amount exceeds this level, the solvent resistance of the dried film tends to be inadequate. Further, by incorporating the polyester resin in an amount of at least 2 parts by weight, it is possible to improve the fluidity of the water-color ink and the dispersion stability of the inorganic solid components.

As the amide resin, a water-dispersible or glycol-dispersible polyamide wax is preferably used, whereby the ink ejecting property of the resulting water-color ink through a screen mesh will be improved. Its amount is preferably at most 15 parts by weight per 100 parts by weight of the aqueous medium. If the amount exceeds this level, the heat resistance of the coating thereby formed or the adhesive strength to a substrate tends to be low. To obtain the effects for improving the ejecting property from the screen mesh, it is preferred to add it in an amount of at least 0.1 part by weight.

As the polyethylene glycol derivative, a polyethylene glycol having a molecular weight of from about 1,000 to 20,000, which is solid at room temperature, or a polyethylene glycol fatty acid ester such as the monostearate or monolaurate of such a polyethylene glycol, may, for example, be mentioned, whereby the fluidity of the water-color ink will be improved by virtue of its surface activity. Its amount is preferably at most 30 parts by weight per 100 parts by weight of the aqueous medium, and it is most effective to use it within a weight ratio range of the cellulose derivative/the polyethylene glycol derivative of from 1/1 to 2/1 from the viewpoint of the plastization of the coating. The polyethylene glycol derivative is highly reactive with other components, and in order to stabilize the ink, it is possible to add a polyethylene glycol having a molecular weight of from 200 to 600, which is liquid at room temperature, in an amount within a range of from 1 to 15 wt %.

The organic binders as described above, may be used alone or in combination as a mixture. To impart an excellent printing property to the resulting water-color ink, it is preferred to use the cellulose derivative as an essential component in combination with at least one organic binder selected from the group consisting of aldehyde derivatives, epoxy compounds, acrylic resins, polyester resins, amide resins and polyethylene glycol derivatives, to attain functions required depending upon the type of the heat resistant substrate. Especially when a curable compound such as an aldehyde derivative or an epoxy compound is used, it is possible to form an excellent printed coating. When the amount of the organic solvent in the aqueous medium is at most 50 wt %, it is preferred to use such other organic binders in an amount of from 1 to 300 parts by weight, more preferably from 1 to 200 parts by weight, each, and in an amount of from 1 to 400 parts by weight in total, per 100 parts by weight of the cellulose derivative. On the other hand, when the amount of the organic solvent in the aqueous medium exceeds 50 wt %, such other organic solvent-soluble organic binders may be used in an amount of from 1 to 3,000 parts by weight each, and from 1 to 5,000 parts by weight in a total amount of the water-soluble and organic solvent-soluble organic binders, per 100 parts by weight of the cellulose derivative.

The fusible inorganic component in the water-color ink serves as an inorganic adhesive, and it may, for example, be a powder, a micropowder or a colloidal dispersion of e.g. glass, metal, a metal compound, an oxide, an alkali metal silicate or a phosphoric acid salt. For a glassy adhesive, a low melting point glass or crystallized glass composition of e.g. lead borosilicate type, zinc borosilicate type or bismuth borosilicate type, may, for example, be used. When a micropowder of metal is used as the fusible inorganic component, silver, gold, palladium and copper may, for example, be used alone or in combination as a composite composition. In the case of a micropowder of an oxide, a method may be employed wherein formation of a liquid phase by a reaction with a composition in the inorganic powder component to be bonded by fusion, is utilized, and an eutectic product of e.g. aluminum oxide, silicon oxide, manganese oxide or zirconium oxide may, for example, be used as the adhesive layer. Further, a silica sol, an alumina sol or a titania sol, which is a colloidal dispersion of an oxide, is useful for baking at a relatively low temperature.

The infusible inorganic powder component is not essential to the present invention, but may be incorporated to the ink of the present invention to impart to the ink such functions as color properties, electrical conductivity, electrical resistance, insulating properties or abrasion resistance. The infusible inorganic powder component may, for example, be an oxide, a nitride, a boride or a metal. Such an inorganic powder component has adequate heat resistance even at the baking temperature of the coating and has a composition which by itself will not adhere to the heat resistant substrate. Such inorganic powder components may be used alone or in combination as a mixture of two or more of them. Among them, there are those which have the same composition as the fusible inorganic component, but which have high heat resistance due to their particle sizes or structural tissues and thus serve as infusible inorganic powder components when the temperature for fusing is low. The oxide may, for example, be a coloring pigment such as chromium oxide, cobalt oxide, iron oxide, manganese oxide or titanium oxide, or an extender pigment such as silicon oxide, aluminum oxide or magnesium oxide. However, the oxide is not limited to such specific examples.

The above inorganic solid components (the fusible inorganic component and the infusible inorganic powder component) to be used in the water-color ink include various types, such as those which are stable in the aqueous vehicle (the aqueous medium and the organic binder), those which will be stabilized by forming a thin oxide film and those which continuously undergo hydration and oxidation, and in some cases, the surface properties may be influenced by the presence of water. In a case where inorganic solid components which have low stability in water, are to be used, it is possible to carry out surface treatment for water resistance. Various methods are available for such treatment, and optimization is necessary depending upon the inorganic solid components, the baking temperature range, etc. For example, it is preferred to employ a hydrophobic resin coating or adsorption of a chelate compound, i.e. to use the method and material which can be removed by baking the coating.

In the water-color ink of the present invention, the inorganic solid components which finally form a baked coating film, can be baked and sintered within such a range that when the total amount of the fusible inorganic component and the infusible inorganic powder component is 100 wt %, the fusible inorganic component is from 1 to 100 wt %, preferably from 60 to 100 wt %, and the inorganic powder component is from 0 to 99 wt %, preferably from 0 to 40 wt %.

The total amount of these inorganic solid components is preferably from 65 to 95 wt %, more preferably from 75 to 90 wt %, in the total amount of the ink. The amount of the aqueous vehicle is from 5 to 35 wt %, more preferably from 10 to 25 wt %, in the water-color ink. If the amount of the aqueous vehicle is less than 5 wt %, printing tends to be difficult and if it exceeds 35 wt %, the density of the baked film of the inorganic solid components and the adhesion to the heat resistant substrate tend to be inadequate. Further, the amount of the organic binder in the aqueous vehicle is preferably from 5 to 40 parts by weight per 100 parts by weight of the aqueous medium, whereby it is possible to attain the printing property of the resulting water-color ink, the dispersion stability of the fusible inorganic component and the infusible inorganic powder component, and the adhesion to the heat resistant substrate, and it is further possible to burn off the organic binder by heat treatment.

In preparation of the water-color ink of the present invention, conventional additives, such as a dispersant, a wetting agent, a defoaming agent, a leveling agent, a plasticizer, a lubricant, a curing agent, an antiseptic, a rust-preventing agent and an antifreezing agent, may be incorporated as the case requires. However, when these additives are incorporated, it is necessary to select them so that in baking the formed coating, no troublesome residue will remain in the baked coating, as in the case of the aqueous vehicle.

In the process for preparing the ink of the present invention comprising the above described components, firstly, the aqueous vehicle is prepared, and the inorganic solid components and the aqueous vehicle are then kneaded by a kneading machine and a three roll mill, and it is effective to add an additive such as a dispersing agent at the initial stage of kneading. The preparation method will be described with reference to an example wherein the aqueous vehicle comprises water, a glycol type organic solvent, a resin soluble or dispersible therein, and a cellulose derivative.

Firstly, a water-soluble organic binder having a low thickening property is dissolved in water, and a water-dispersible emulsion resin is dispersed therein. On the other hand, a glycol-soluble binder having a low thickening property is dissolved in a glycol-type organic solvent, a glycol-dispersible resin is dispersed therein, and then a cellulose derivative is dispersed therein. These two liquids are mixed by e.g. an agitation machine, so that the cellulose derivative is dissolved in a uniform dispersed state in the aqueous solution, to prepare an aqueous vehicle having a uniform viscous property and storage stability.

The water-color ink of the present invention is used primarily in a screen printing system. In this case, it is necessary to impart screen printing properties by selecting and combining the ink components. In a case where the ink is used for screen printing, it is advisable to use Brookfield B type viscometer ST4-14 type roter and to adjust the viscosity at a rotational speed of 10 rpm at 25°±1° C. to a level within a range of from 10 to 500 PaS. Further, the water-color ink of the present invention is not limited in its application to a screen printing system and may be used as an ink for other printing system. In such a case, the viscosity of the ink may be adjusted by using water, or a mixture of water and an organic solvent, as a diluting agent, so that the viscosity is suitable for the printing system.

The process for forming an inorganic coating film of the present invention comprises printing the above-mentioned water-color ink of the present invention in an optional pattern on the surface of a heat resistant substrate by screen printing, followed by drying and then by baking at a temperature at which an organic substance in the printed coating is removed and at which the fusible inorganic component fuses, to form an inorganic coating film containing no organic substance.

The heat resistant substrate as the substrate to be printed, to be used in the present invention, is not particularly limited. Depending upon the particular purpose, a glass such as soda lime aluminosilicate glass, aluminosilicate glass, borosilicate glass, lithiumsilicate glass or quartz glass, ceramics such as aluminum oxide, magnesium oxide, silicon nitride or aluminum nitride, or a combination of such ceramics and glass, may be employed. Further, on such a heat resistant substrate, a coating film made of a heat resistant component such as ITO, GZO, $SiO_2$, $TiO_2$, ZnO or $SnO_2$, may be present.

Further, it is also possible to print on the coating formed by printing and drying the water-color ink on a heat resistant substrate, a water-color ink containing the same composition or a totally different inorganic composition, or other organic solvent type ink, so that the two coatings may be baked simultaneously. Otherwise, it is also possible to print on a coating formed by printing and drying other organic solvent type ink, the water-color ink of the present invention, and bake the two coatings simultaneously. The inorganic solid components of the respective inks to be laminated in such a case, are not particularly restricted, and powders of glass, ceramics, metal, etc. may be used in a proper combination depending upon the particular purpose.

The drying and curing method of the printed coating formed from the water-color ink of the present invention, may be optionally selected depending upon the necessity in the subsequent step. However, in a case where an adequate coating hardness is required, it is preferred to employ microwave drying or heat drying at a temperature of at least 80° C. In a case where the production line is directly connected to the baking step, and no high hardness of the dried coating is required, room temperature drying or drying by air circulation may be employed.

In baking the dried coating, the lower limit is the temperature at which the organic components in the aqueous vehicle undergo pyrolysis and evaporation, and the upper limit is the heat resistant temperature of the heat resistant substrate. Further, taking the fluidity of the fusible inorganic component into consideration, a preferred range of the baking temperature is from 400° to 900° C. However, in a case where a water-color ink comprising a metal or oxide having a high melting point as the inorganic solid component, is used in combination with a ceramic substrate having high heat resistance, it is unnecessary to limit the baking temperature within the above temperature range. The baking atmosphere is preferably an air stream, when the pyrolysis or evaporation of the organic binder (the oligomer and/or monomer) is taken into consideration. However, in a case where the inorganic solid components are susceptible to oxidation, it is necessary to carry out adequate drying of the moisture in the printed coating and baking in a nitrogen stream. Further, the pyrolysis of the organic binder may be accelerated by incorporating a binder removal assistant such as cerium oxide into the ink or by introducing steam into the nitrogen stream to accelerate the pyrolysis of the organic binder during baking, as is employed in a conventional organic solvent type ink system.

In the present invention, the water-color ink of the present invention contains a relatively high concentration of inorganic solid components, and nevertheless, it is printable by screen printing, and it is finally possible to obtain a dense baked film. The reason is not clearly understood, but may be attributable to the facts that in the water-color ink of the present invention, water or preferably a mixed liquid of water with glycol type organic solvent, is used as the aqueous medium, a cellulose derivative is contained as a water-soluble and/or water-dispersible organic binder, and if necessary, a thermoplastic resin, a thermosetting resin or a glycol type organic solvent is contained, and further, such an organic binder is soluble or dispersible in the glycol type organic solvent, and the water-color ink, as a whole, has fluidity in a highly dispersed state of inorganic solid components and has stability as the ink.

Various applications of the ink of the present invention are summarized in the following Table 1.

Table 1 shows from the left to the right, the applications, examples of the fusible inorganic component, examples of the infusible inorganic powder component, a typical weight ratio of the fusible inorganic component to the infusible inorganic powder component, and the fusing temperature. Black ceramic paste is used typically for the purpose e.g. decoration along the peripheral portion of a window glass of an automobile. When a plurality of components are given in the column for examples of such components, one or more from the plurality may be used in combination.

To 20 parts of this aqueous vehicle, 50 parts of glass frit (fusible inorganic component) and 30 parts of chromium oxide type black pigment (infusible inorganic powder component), 0.5 part of a nonionic surfactant (Nopko 8034, tradename, manufactured by Sannopko K.K.) and 1 part of ammonium polycarboxylate (Nopkosant RFA, tradename) as a dispersant, were kneaded by a kneading machine and a three roll mill. Then, a diluting agent prepared by mixing water and dipropylene glycol in a weight ratio of 3:1, was added in an amount of 10 parts per 100 parts of the ink, to adjust the viscosity of the water-color ink to a level of from 30 to 45 PaS. For the measurement of the viscosity, Brookfield viscometer ST4-14 type roter was used, and the viscosity was measured at a rotational speed of 10 rpm at 25°±1° C. This ink was printed by screen printing to form a coating on a soda lime glass substrate by using a 200 mesh stainless steel screen and a rubber squeegee having a hardness of 700 and heat-dried at 100° C. for 20 minutes, followed by baking in an air atmosphere at 700° C. for 10 minutes to obtain a sintered film having an inorganic composition.

EXAMPLE 2

The operation was carried out in the same manner as in Example 1 except that instead of the acrylic resin emulsion

TABLE 1

| Applications | Fusible inorganic component | Infusible inorganic powder component | Weight ratio of fusible inorganic component/infusible inorganic powder component | Fusing temp. (°C.) |
| --- | --- | --- | --- | --- |
| Black ceramic paste | PbO—$SiO_2$—$B_2O_3$ type, PbO—$SiO_2$—$TiO_2$ type, $Bi_2O_3$—$SiO_2$ type, ZnO—$SiO_2$ type, Glass frit | $Al_2O_3$, $TiO_2$, $CuCr_2O_4$ type, $MnO_2$ type Black pigment | 80/20–60/40 | 550 to 750 |
| Conductive paste | PbO—$SiO_2$ type Glass frit | Ag powder | 1/99–20/80 | 550 to 950 |
| Resistor paste | $SiO_2$—$B_2O_3$—$Al_2O_3$ type Glass frit | Ru type conductive particles | 99/1–90/10 | 600 to 900 |
| Dielectric paste (for glass substrate) | PbO—$SiO_2$—$B_2O_3$ type Glass frit | $SiO_2$, $Al_2O_3$, $ZrSiO_4$, $Cr_2O_3$ type pigment | 100/0–80/20 | 500 to 700 |
| Dielectric paste (for ceramic substrate) | $B_2O_3$—$SiO_2$—$Al_2O_3$ type Glass frit | $SiO_2$, $Al_2O_3$, $ZrSiO_4$, $Cr_2O_3$ type pigment | 100/0–80/20 | 700 to 950 |

Now, the present invention will be described in further detail with reference to Examples. However, it should be understood that the present invention is by no means restricted to such specific Examples. In the following Examples, "parts" or "%" means "parts by weight" or "% by weight", respectively, unless otherwise, specified.

EXAMPLE 1

5 parts of hydroxypropylmethyl cellulose was dispersed in 20 parts of dipropylene glycol. On the other hand, 20 parts of an aqueous aliphatic dialdehyde solution (a solution having 40 parts of an aliphatic dialdehyde dissolved in 60 parts of water) was dissolved in 45 parts of water, and 10 parts of an acrylic resin emulsion dispersion (a dispersion having 30 parts of an acrylic resin dispersed in 70 parts of water) was dispersed therein. These liquids were mixed to dissolve hydroxypropylmethyl cellulose in the aqueous solution to obtain a viscous aqueous vehicle.

dispersion in Example 1, 10 parts of a cresol novolak type epoxy resin emulsion dispersion (a dispersion having 25 parts of an epoxy resin dispersed in 75 parts of water) was used.

EXAMPLE 3

The operation was carried out in the same manner as in Example 1 except that in Example 1, the hydroxypropylmethyl cellulose was changed to 7 parts, the aqueous aliphatic dialdehyde solution was changed to 15 parts, and instead of the acrylic resin emulsion dispersion, 7 parts of a glycol-soluble polyester resin and 1 part of amide wax were used.

EXAMPLE 4

The operation was carried out in the same manner as in Example 1 except that in Example 1, instead of the aqueous aliphatic dialdehyde solution, 10 parts of an ethylene glycol diglycidyl ether type epoxy resin was used, instead of the acrylic resin emulsion dispersion, 8 parts of the cresol novolak type epoxy resin emulsion dispersion as used in Example 2, was used, water was changed to 50 parts, and 5 parts of a polypropylene glycol as an organic solvent in the aqueous medium, and 2 parts of a polyamide wax as an organic binder, were added.

EXAMPLE 5

The operation was carried out in the same manner as in Example 1 except that in Example 1, the hydroxypropylmethyl cellulose was changed to 7 parts, and instead of the acrylic resin emulsion dispersion, 7 parts of a polyethylene glycol (molecular weight: 20,000) and 1 part of a polyamide wax were used.

EXAMPLE 6

In the same manner as in Example 1, 10 parts of hydroxypropylmethyl cellulose, 10 parts of a modified bisphenol A type epoxy resin emulsion dispersion (a dispersion having 50 parts of an epoxy resin dispersed in 50 parts of water), 5 parts of a terephthalic acid/isophthalic acid copolymer type polyester resin, 5 parts of a polyethylene glycol monostearate, 50 parts of water and 20 parts of propylene glycol were mixed to obtain an aqueous vehicle. To 15 parts of this aqueous vehicle, 50 parts of glass frit as a fusible inorganic component, 25 parts of a chromium oxide type black pigment as an infusible inorganic powder component, 10 parts of titanium oxide, 0.2 part of a dispersant (Disperbyk-184, manufactured by Byk Chemi K.K.) and 0.2 part of a rust-preventing agent (Nopkoside SN70), were kneaded. Then, polyethylene glycol (molecular weight: 400) as an ink stabilizer in an amount of 5 parts per 100 parts by weight of the ink, and a diluting agent comprising water/propylene glycol in a weight ratio of 2/1, in an amount of 10 parts per 100 parts of the ink, were added to obtain a water-color ink. Printing and baking were carried out in the same manner as in Example 1.

EXAMPLE 7

Preparation of the water-color ink was carried out in the same manner as in Example 1 except that in Example 1, instead of the hydroxypropylmethyl cellulose, 10 parts of methyl cellulose was used, and instead of dipropylene glycol, 5 parts of a propylene glycol monoethyl ether and 15 parts of propylene glycol were used. Printing and baking were carried out in the same manner as in Example 1.

EXAMPLE 8

The operation was carried out in the same manner as in Example 1 except that in Example 1, instead of the acrylic resin emulsion dispersion, 3 parts of carboxymethyl cellulose was used, the dipropylene glycol was changed to 10 parts, the water was changed to 55 parts, 10 parts of dipropylene glycol monomethyl ether was used as an organic solvent, and 2 parts of a polyamide wax was added as an organic binder.

EXAMPLE 9

Preparation of the water-color ink was carried out in the same manner as in Example 1 except that to 15 parts of the aqueous vehicle in Example 1, 82 parts of fine powder of silver having the surface treated for water resistance with a citric acid chelate compound, as an infusible inorganic powder component, and 3 parts of a borosilicate type glass frit as a fusible inorganic component, were used.

This ink was printed by screen printing to form a coating on a soda lime glass substrate by means of a 250 mesh stainless steel screen and a rubber squeegee having a hardness of 800, and then heat-dried at 100° C. for 20 minutes, followed by baking in an air atmosphere at 700° C. for 10 minutes, to obtain a sintered film having an inorganic composition.

EXAMPLE 10

Preparation of a water-color ink was carried out in the same manner as in Example 9. This ink was printed by screen printing to form a coating on a glass ceramic substrate by means of a 250 mesh stainless steel screen and a rubber squeegee having a hardness of 800 and heat-dried at 120° C. for 30 minutes, followed by baking in an air atmosphere at 900° C. for 10 minutes, to obtain a sintered film having an inorganic composition.

EXAMPLE 11

Preparation of a water-color ink was carried out in the same manner as in Example 1 except that to 15 parts of the aqueous vehicle of Example 1, 70 parts of lead borosilicate type glass frit, 10 parts of a silica sol and 5 parts of an alumina sol, as fusible inorganic components, were used. However, a diluting agent prepared by mixing water and propylene glycol in a weight ratio of 2:1, was added in an amount of 8 parts per 100 parts of the ink to adjust the viscosity of the water-color ink to 100 PaS. This ink was printed by screen printing to form a coating on a soda lime type glass substrate by means of a 100 mesh stainless steel screen and a rubber squeegee having a hardness of 900, and the coating was dried for 10 minutes by a microwave and baked for degreasing at 350° C. for 30 minutes, followed by baking in an air atmosphere at 600° C. for 10 minutes, to obtain a sintered film having an inorganic composition.

EXAMPLE 12

Preparation of a water-color ink was carried out in the same manner as in Example 1 except that to 20 parts of the aqueous vehicle of Example 1, 50 parts of a zinc borosilicate type glass frit and 30 parts of a bismuth borosilicate type glass frit were used as fusible inorganic components.

This ink was printed to form a coating on an aluminum oxide substrate by means of a 250 mesh stainless steel screen and a rubber squeegee having a hardness of 800, and heat-dried at 120° C. for 10 minutes, followed by baking in an air atmosphere at 550° C. for 10 minutes, to obtain a sintered film having an inorganic composition.

EXAMPLE 13

In the same manner as in Example 1, 2 parts of hydroxypropylmethyl cellulose, 15 parts of a polyethylene glycol diglycidyl ether, 5 parts of a glycol soluble polyester resin, 3 parts of a polyethylene glycol monostearate, 20 parts of water, 45 parts of propylene glycol and 10 parts of diethylene glycol, were mixed to obtain an aqueous vehicle. To 15 parts of this aqueous vehicle, 50 parts of glass frit as a fusible inorganic component, 25 parts of a chromium oxide type black pigment and 10 parts of titanium oxide, as infusible inorganic powder components, 0.2 part of a dispersing agent (Disperbyk-184, manufactured by Byk Chemi K.K.), and 0.2 part of a rust-preventing agent (Nopkoside SN70), were kneaded, and a diluting agent comprising water:propylene glycol in a weight ratio of 1:5, was added in an amount of 15 parts per 100 parts of the ink, to obtain a water-color ink. Printing and baking were carried out in the same manner as in Example 1.

EXAMPLE 14

A water-color ink was prepared in the same manner as in Example 13 except that in Example 13, the polyethylene glycol diglycidyl ether was changed to 10 parts, 5 parts of a modified bisphenol A type epoxy emulsion dispersion (a dispersion having 50 parts of an epoxy resin dispersed in 50 parts of water), was used, instead of the glycol-soluble polyester resin, 1 part of a polyamide wax was used, and a polyethylene glycol (molecular weight: 400) as an ink stabilizer, was used in an amount of 4 parts per 100 parts of the ink. Printing and baking were carried out in the same manner as in Example 1.

Evaluation of Examples

The following evaluation tests were carried out with respect to the baked coating films having inorganic compositions, obtained in Examples 1 to 14, and the results are shown in Table 2.

1) Test on printing properties

Evaluation items and evaluation standards were as follows.

a) Screen printing ejection property

Transferability of a pattern to the substrate to be printed, was inspected.

○: No defects were observed in the pattern.

X: Defects were observed in the pattern, and the ink was not printed partially.

b) Pinholes

○: No pinholes were observed.

X: Pinholes were observed.

c) Gradation printing

By means of a printing plate in which dots having a diameter of about 2 mm are in a gradation pattern, transferability of the pattern to the substrate to be printed, was inspected.

○: No defects were observed in the pattern.

X: Defects were observed in the pattern, and the ink was not printed partially.

2) Test on sinterability

The evaluation standards were as follows (the opaque substrates (Example 10 and Example 12) were evaluated under only the evaluation standard C).

a) Opacity (Opacifying effect)

With a visible light, the transmission density Df=log10 (1/transmittance T) was measured.

○: Transmittance T%<0.1

X: Transmittance T%>0.1 b) Penetration of marker ink

Commercially available oil-type marker ink was coated on the baked coating film surface, and observed from the rear side of the transparent substrate.

○: The portion coated with the marker ink was not identified.

X: Penetration of the marker ink was observed.

c) Microscopic observation

Microscopic observation was carried out by the reflected light under 50 magnifications and 200 magnifications.

○: Non-sintered defect portions such as peeling, cracks or large bubbles, were not observed.

○: Non-sintered defect portions such as peeling, cracks or large bubbles, were observed.

TABLE 2

| Examples | Test on the printing properties | | | Test on sinterability | | |
|---|---|---|---|---|---|---|
| | a | b | c | a | b | c |
| 1 | ○ | ○ | ○ | ○ | ○ | ○ |
| 2 | ○ | ○ | ○ | ○ | ○ | ○ |
| 3 | ○ | ○ | ○ | ○ | ○ | ○ |
| 4 | ○ | ○ | ○ | ○ | ○ | ○ |
| 5 | ○ | ○ | ○ | ○ | ○ | ○ |
| 6 | ○ | ○ | ○ | ○ | ○ | ○ |
| 7 | ○ | ○ | ○ | ○ | ○ | ○ |
| 8 | ○ | ○ | ○ | ○ | ○ | ○ |
| 9 | ○ | ○ | ○ | ○ | ○ | ○ |
| 10 | ○ | ○ | ○ | — | — | ○ |
| 11 | ○ | ○ | ○ | ○ | ○ | ○ |
| 12 | ○ | ○ | ○ | — | — | ○ |
| 13 | ○ | ○ | ○ | ○ | ○ | ○ |
| 14 | ○ | ○ | ○ | ○ | ○ | ○ |

According to the present invention, it is possible to form a dense baked coating film free from peeling or voids, by printing the water-color ink on a heat resistant substrate, followed by baking.

What is claimed is:

1. A water-color ink composition comprising a fusible inorganic component, an aqueous medium and an organic binder soluble and/or dispersible in the aqueous medium.

2. The water-color ink composition according to claim 1, which further contains an infusible inorganic powder component.

3. The water-color ink composition according to claim 1, wherein the aqueous medium contains a water-miscible glycol organic solvent.

4. The water-color ink composition according to claim 1, wherein the organic binder is at least one member selected from the group consisting of cellulose derivatives, aldehyde derivatives, epoxy compounds, acrylic resins, polyester resins, amide resins and polyethylene glycol derivatives.

5. The water-color ink composition according to claim 3, wherein the glycol organic solvent is at least one member selected from the group consisting of propylene glycol, dipropylene glycol, propylene glycol alkyl ethers, dipropylene glycol alkyl ethers and polypropylene glycols.

6. The water-color ink composition according to claim 1, wherein in the total weight of the ink composition, the sum of the fusible inorganic component and the infusible inorganic powder component is from 65 to 95 wt %, and the sum of the aqueous medium and the organic binder is from 5 to 35 wt %; when the total amount of the above inorganic solid components is 100 wt %, the fusible inorganic component is from 1 to 100 wt %, and the infusible inorganic powder component is from 0 to 99 wt %; and the organic binder is from 5 to 40 parts by weight per 100 parts by weight of the aqueous medium.

7. The water-color ink composition according to claim 1, wherein the organic binder is a mixture of at least two organic binders, and at least one of them is a cellulose derivative.

8. The water-color ink composition according to claim 1, which is for screen printing.

9. A process for forming an inorganic coating film containing no organic substance, which comprises printing the water-color ink composition as defined in claim 1 in an optional pattern on the surface of a heat resistant substrate by screen printing, followed by drying and then by baking at a temperature at which an organic substance in the printed coating is removed and at which the fusible inorganic component fuses.

* * * * *